Dec. 7, 1965   E. F. HAMILTON ETAL   3,222,113
ARTICLE OF FURNITURE
Filed Oct. 30, 1962   11 Sheets-Sheet 1

INVENTORS
EARL F. HAMILTON
DONALD L. MOORE
RALPH B. LAY
BY
ATTORNEYS.

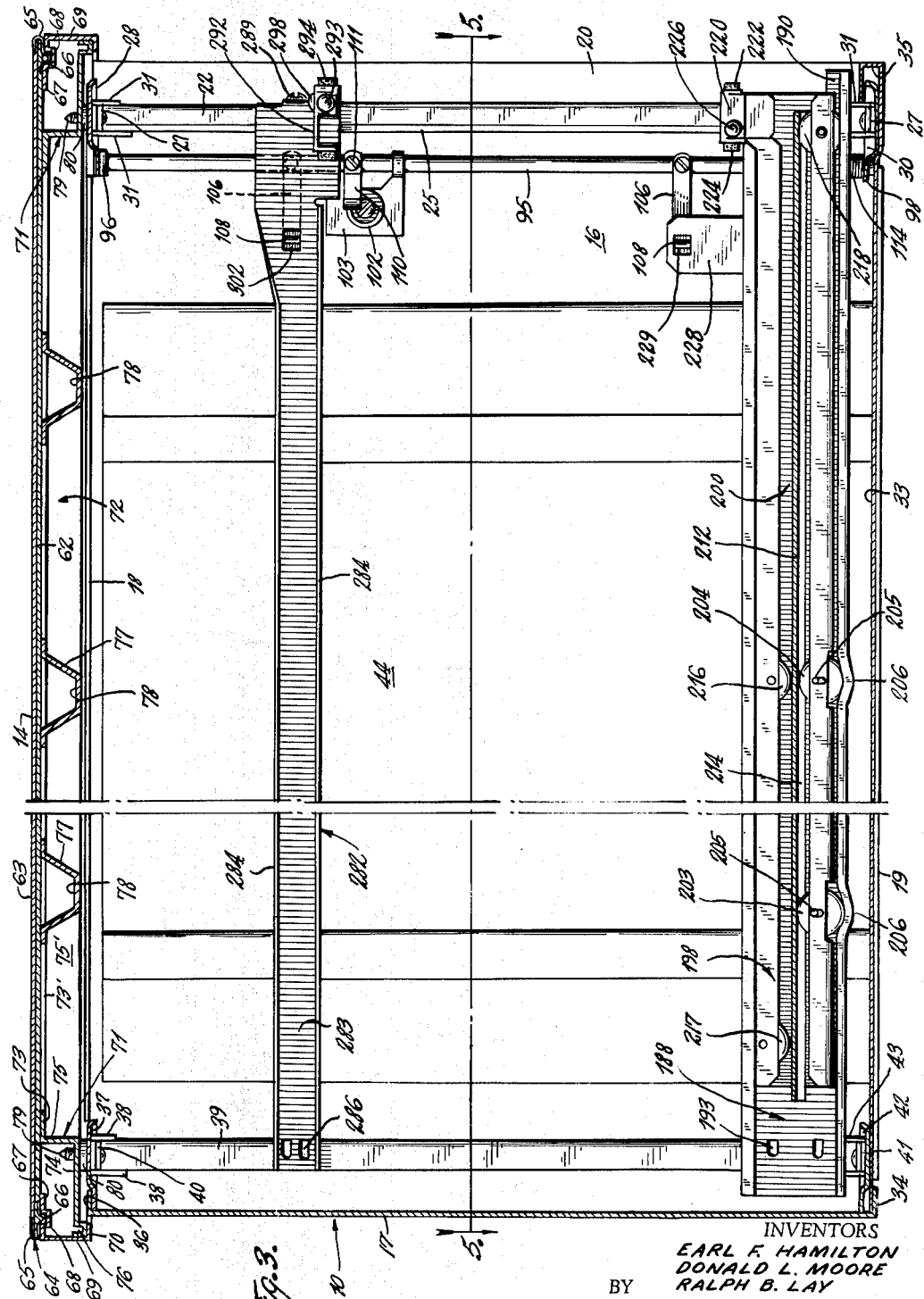

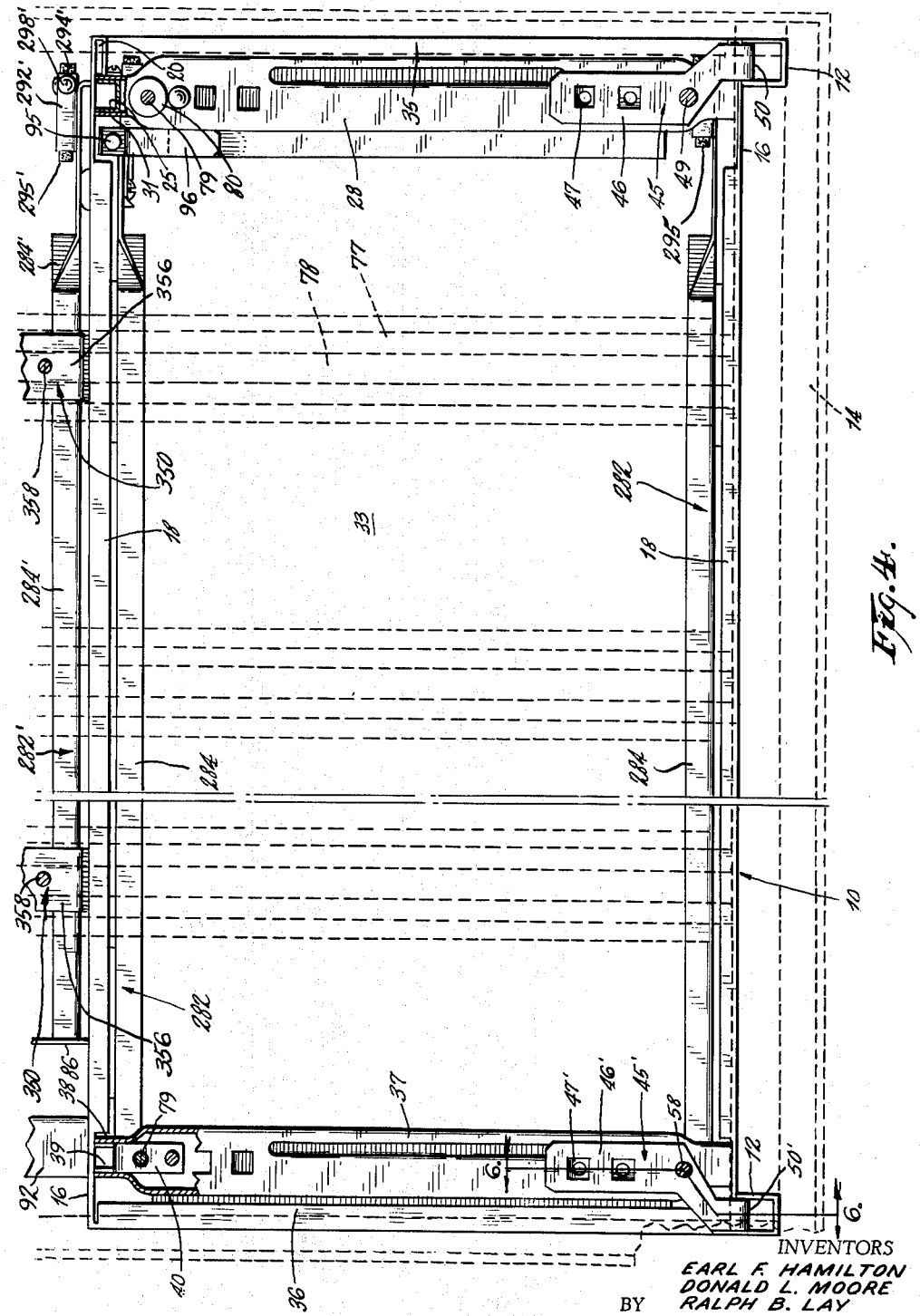

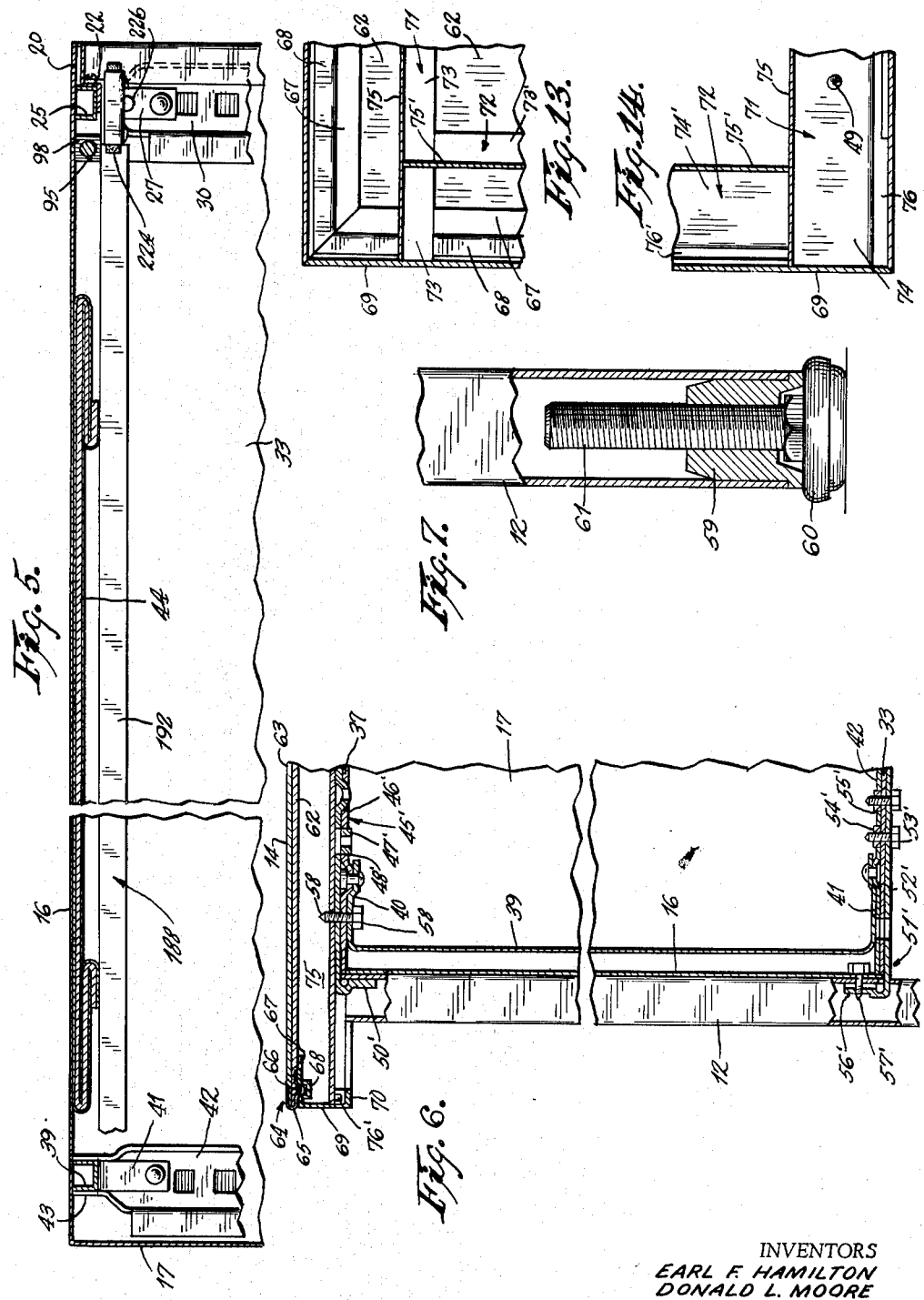

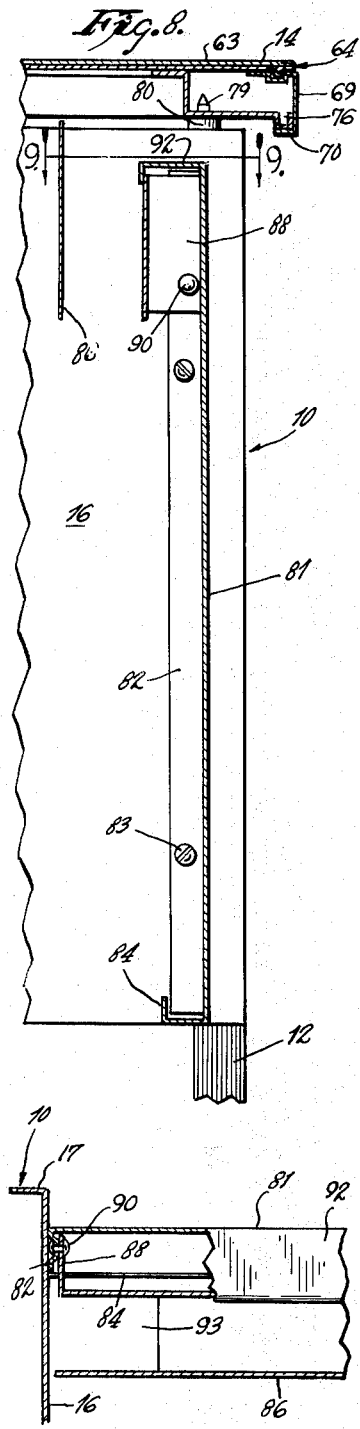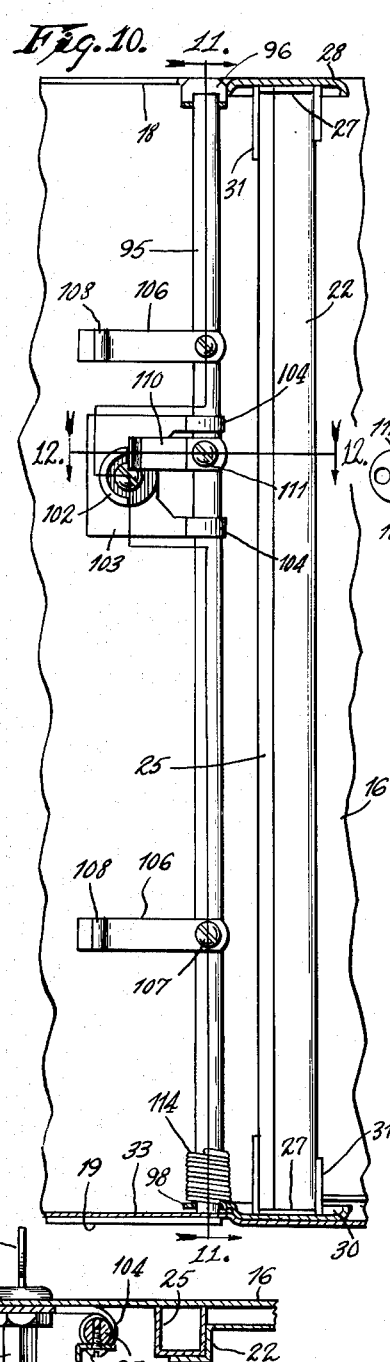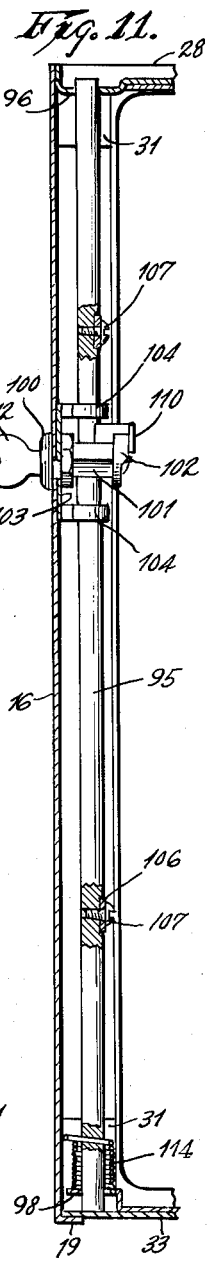

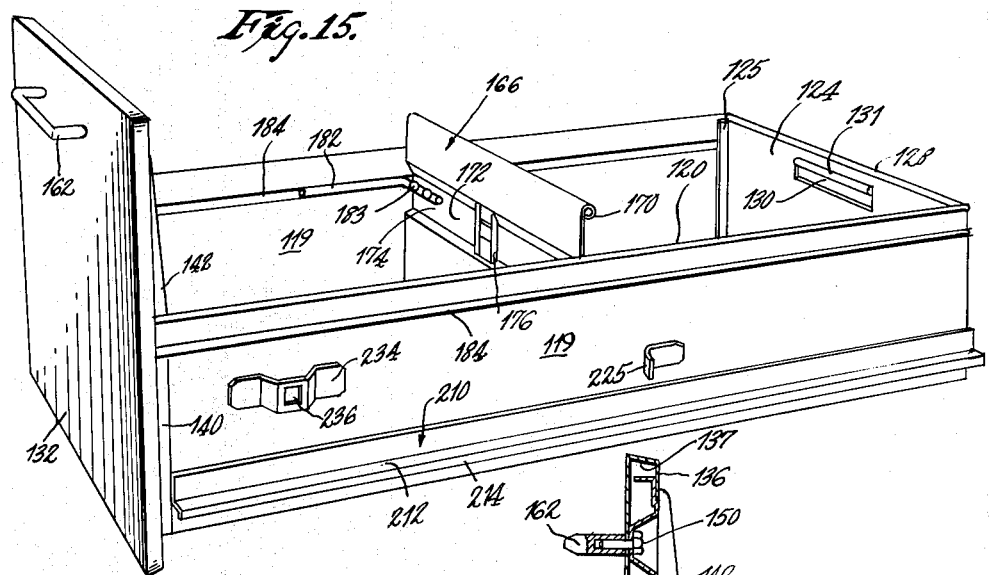
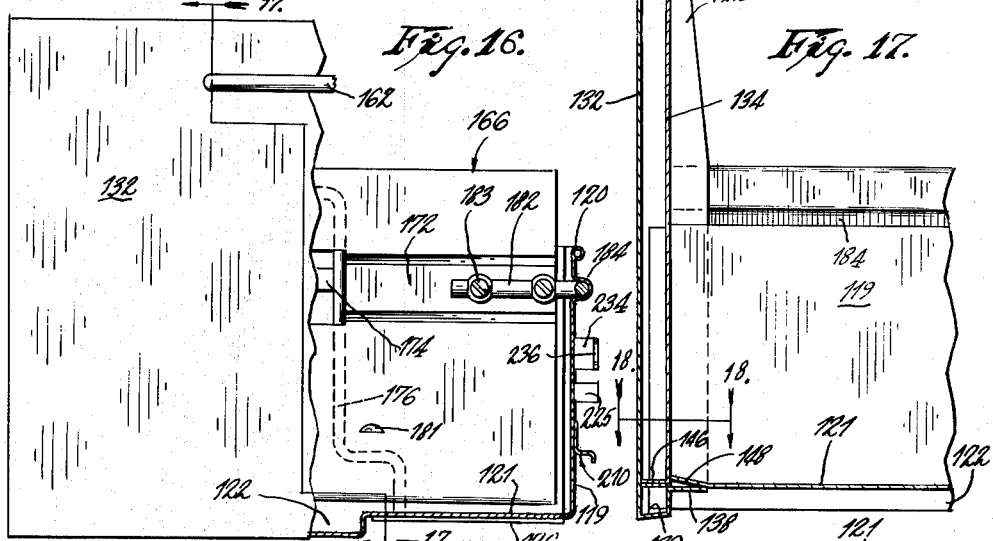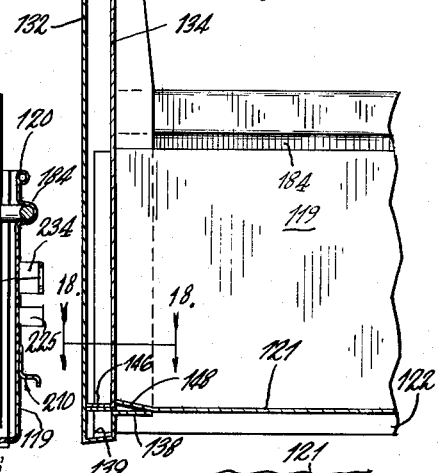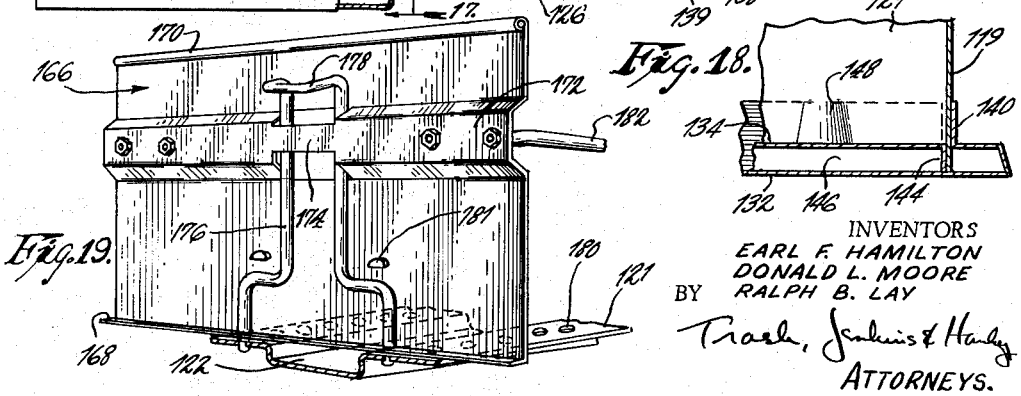

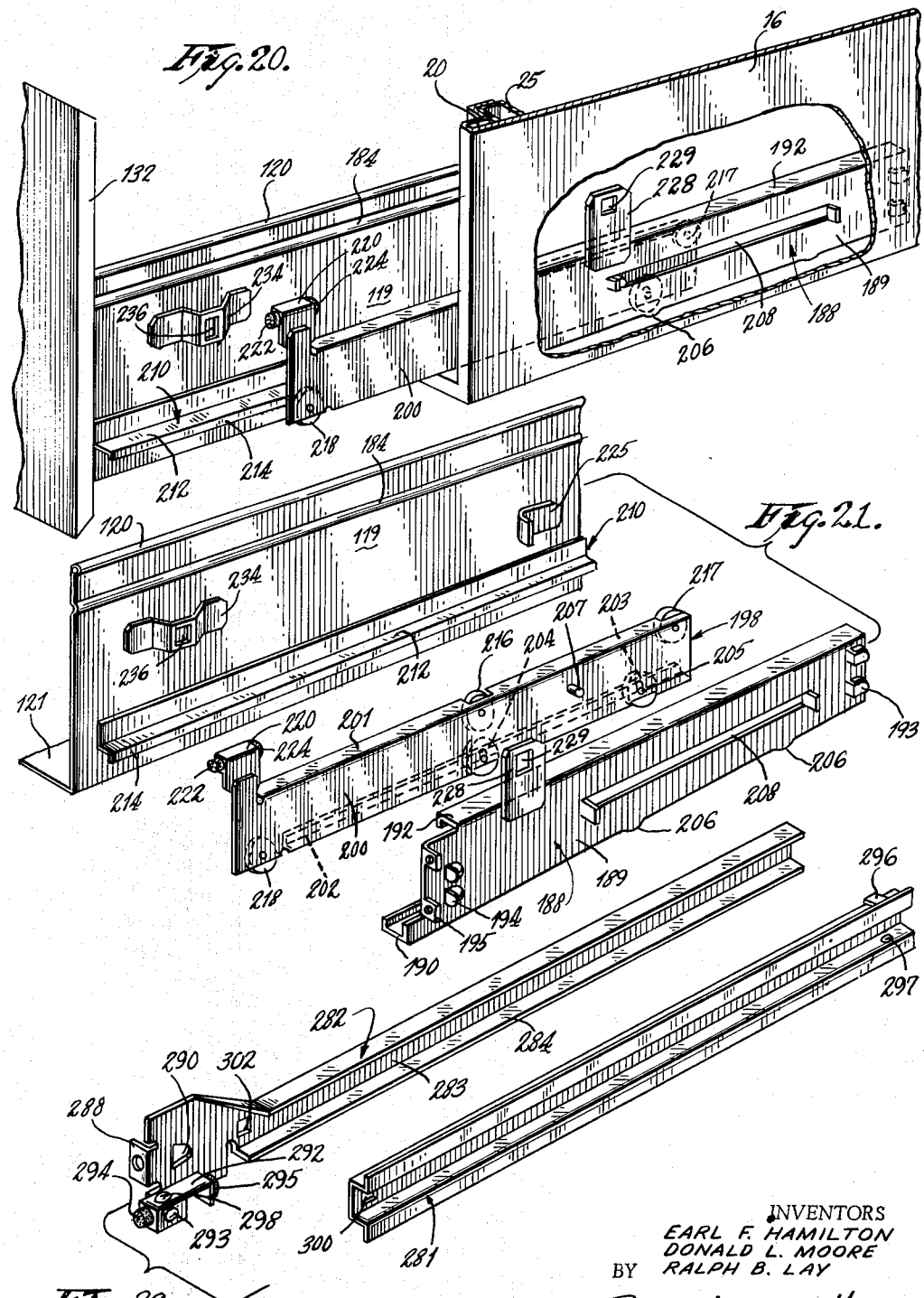

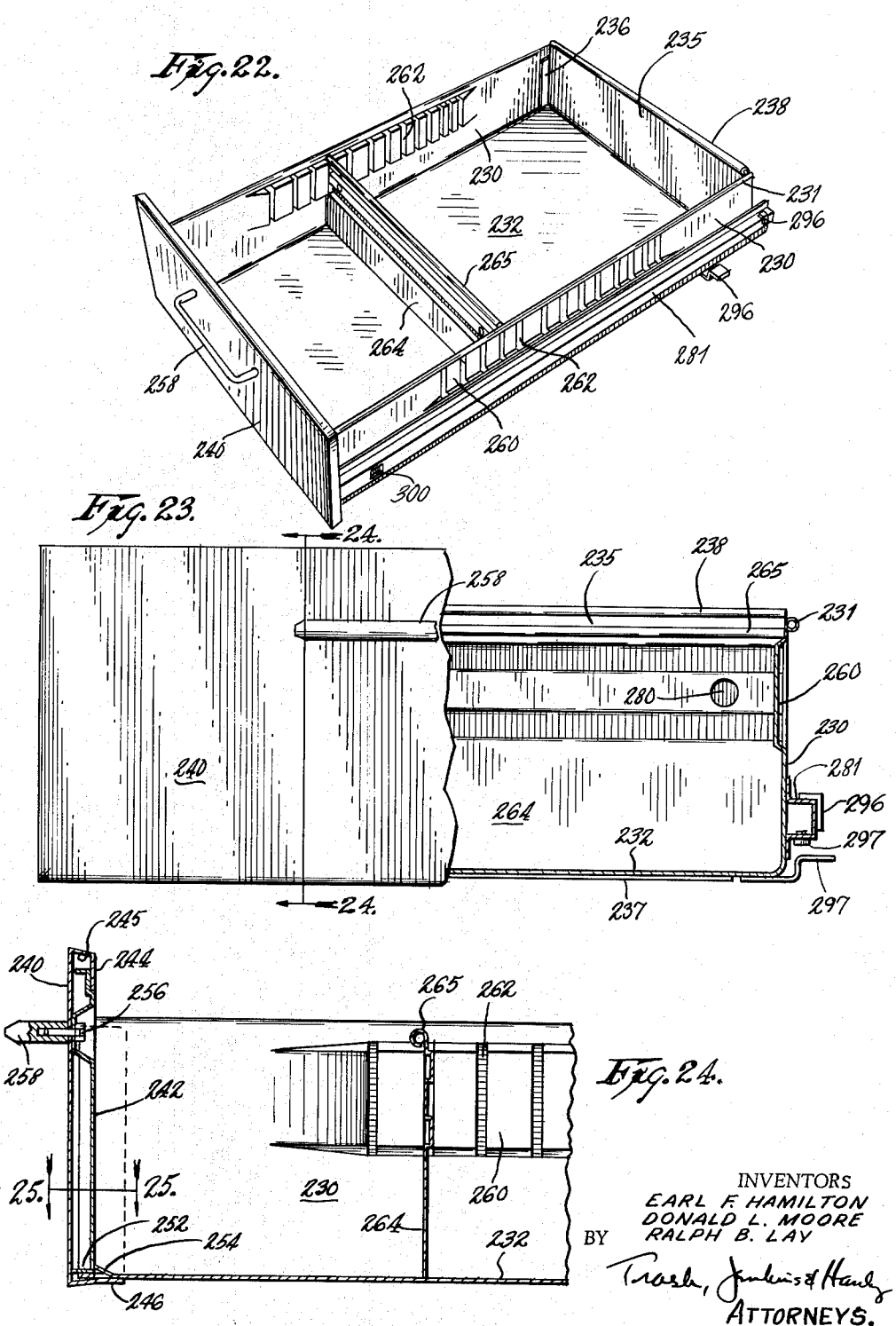

Dec. 7, 1965 E. F. HAMILTON ETAL 3,222,113
ARTICLE OF FURNITURE
Filed Oct. 30, 1962 11 Sheets-Sheet 9
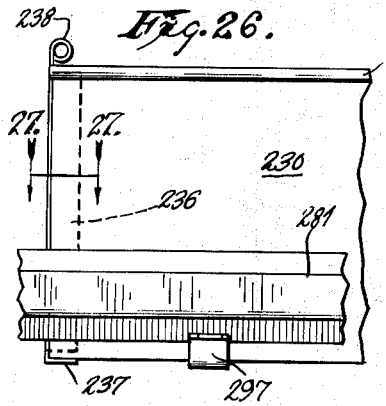
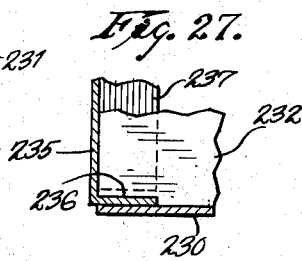
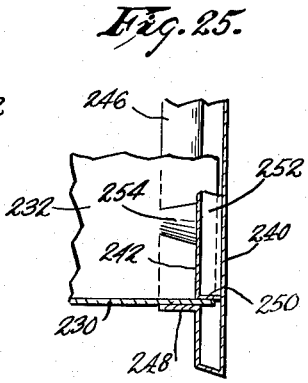
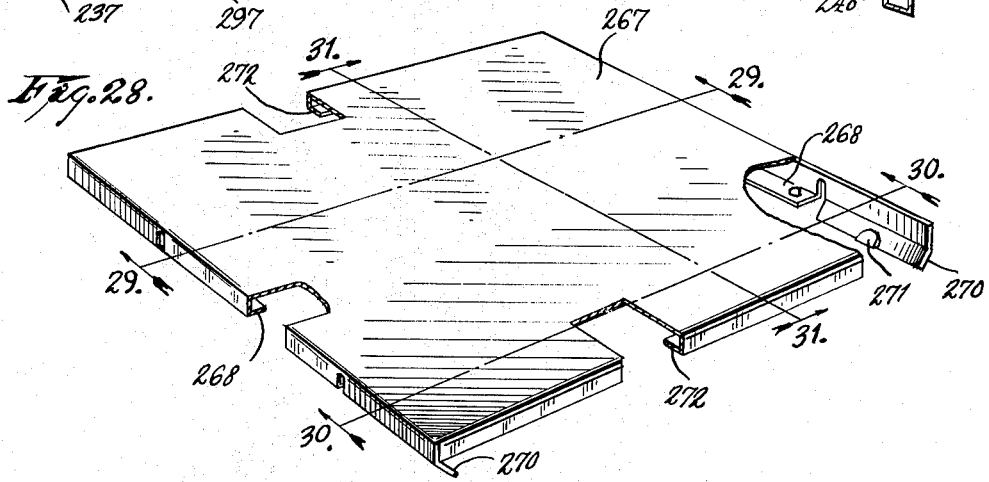
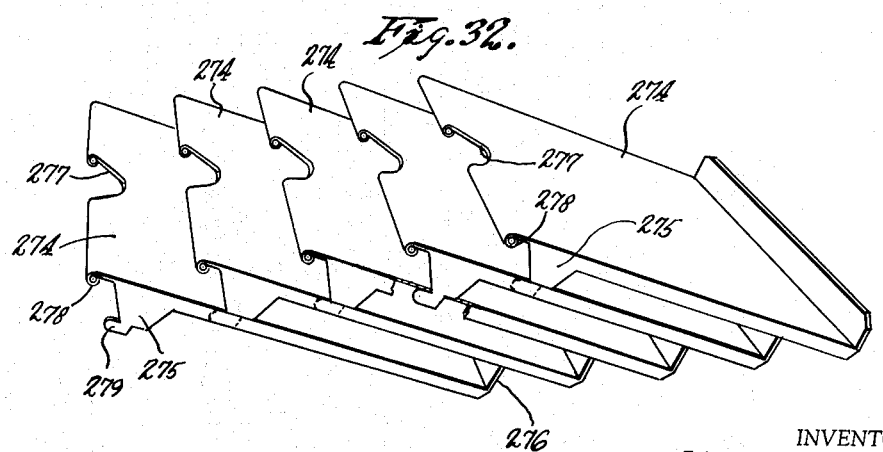
INVENTORS
EARL F. HAMILTON
DONALD L. MOORE
BY RALAPH B. LAY
ATTORNEYS.

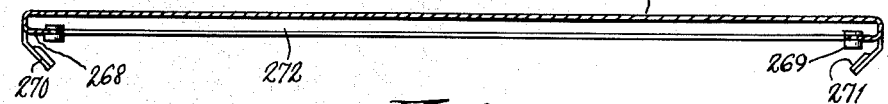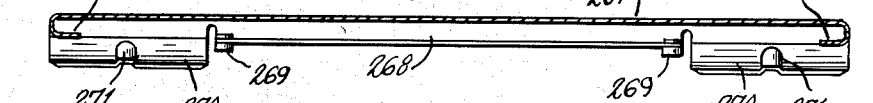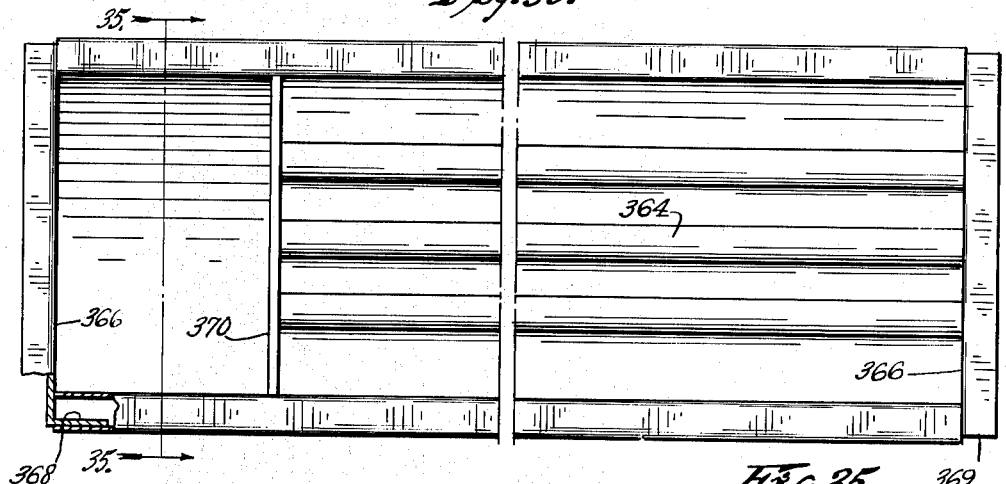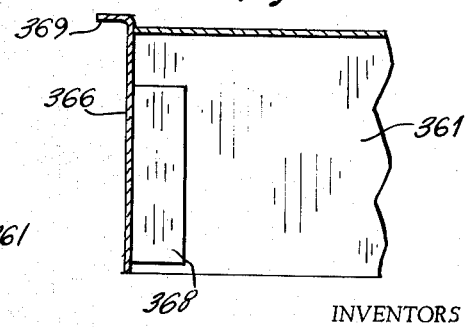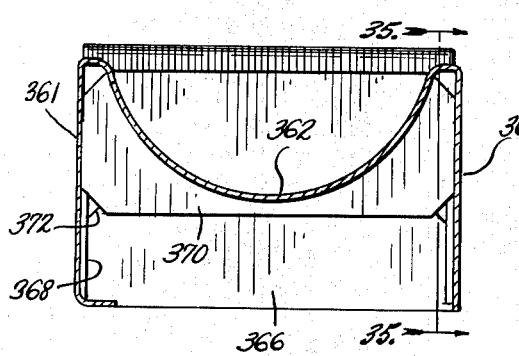
INVENTORS
EARL F. HAMILTON
DONALD L. MOORE
RALPH B. LAY
BY
ATTORNEYS.

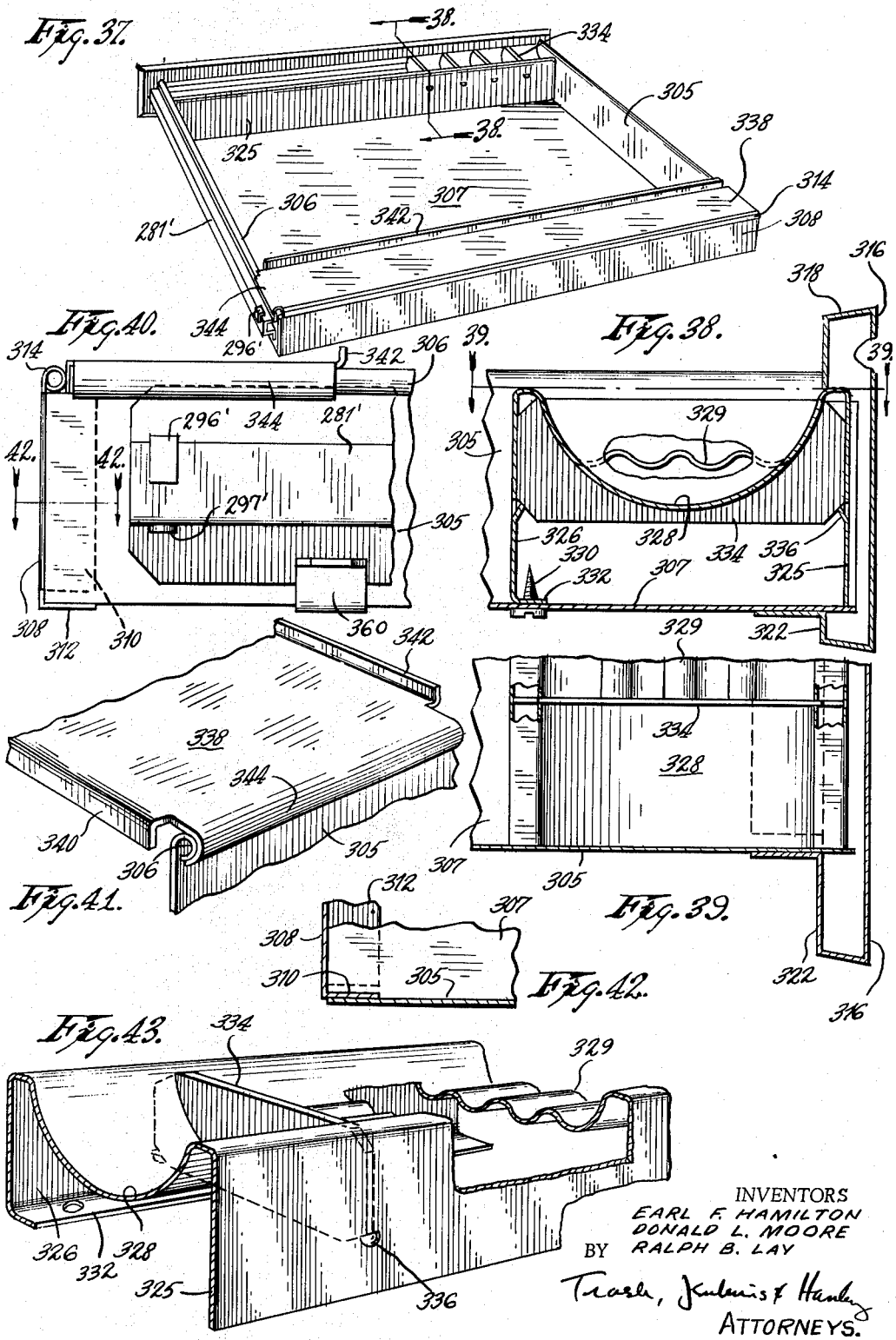

United States Patent Office 3,222,113
Patented Dec. 7, 1965

3,222,113
ARTICLE OF FURNITURE
Earl F. Hamilton, Donald L. Moore, and Ralph B. Lay, Columbus, Ind., assignors to Hamilton Cosco, Inc., Columbus, Ind., a corporation of Indiana
Filed Oct. 30, 1962, Ser. No. 234,183
26 Claims. (Cl. 312—195)

This invention relates to an article of furniture, and more particularly to a desk, cabinet, credenza, and the like.

It is the object of our invention to provide an article of furniture which will have attractive appearance, which will employ a pedestal unit adapted to hold a plurality of drawers, which can be economically manufactured largely from sheet-metal and metal-tubing, and which will prove sturdy and durable in use.

According to the preferred form of our invention, as it is embodied in a double pedestal desk, there is provided a pair of pedestals, each of which has a pair of opposed side walls interconnected by a back wall and floor. The opposed inner faces of the side walls have vertically spaced, horizontally aligned guides mounted thereon for the reception of slides mounted on a plurality of drawers carried in the pedestal. Conveniently, the guides and slides are provided with cooperative antifriction means for facilitating the sliding movement of the drawers with respect to the pedestal and with stop means for limiting said sliding movement of the drawers. Lock means are also mounted on the pedestal for locking engagement with said drawers for releasably locking them in their closed positions within the pedestal.

The pedestals are connected at their upper ends to a desk top extending thereover and therebetween. Desirably, the pedestals are further interconnected by a modesty panel extending therebetween below said top and rigidly connected to the opposed outwardly presented faces on the adjacent side walls of said pair of pedestals.

The pedestals are supported in an elevated position above the floor on pairs of ground-engaging legs mounted on the remote ends thereof. Conveniently, each of said legs is formed as a length of metal-tubing and is rigidly interconnected to the adjacent pedestal adjacent the upper and lower ends of said pedestal. Desirably, the upper end of each of the legs is interconnected to the top through its interconnection to the pedestal, whereby said interconnection will cross-brace said leg, pedestal, and top.

Other objects and features of our invention will become apparent from the more detailed description which follows and from the accompanying drawings, in which:

FIG. 3 is a fragmentary vertical section taken on the line 3—3 of FIG. 2;

FIG. 4 is a fragmentary plan view of the portion of the desk shown in FIG. 2, but showing the top in phantom;

FIG. 5 is a horizontal section taken on the line 5—5 of FIG. 3;

FIG. 6 is a fragmentary vertical section taken on the line 6—6 of FIG. 4;

FIG. 7 is an enlarged fragmentary view of the lower end of one of the pedestal legs, but with portions thereof broken away;

FIG. 8 is a fragmentary vertical section taken on the line 8—8 of FIG. 2;

FIG. 9 is a horizontal section taken on the line 9—9 of FIG. 8;

FIG. 10 is a fragmentary vertical section of one of the pedestal units and showing the drawer locking means therefor;

FIG. 11 is a vertical section taken on the line 11—11 of FIG. 10;

FIG. 12 is a horizontal section taken on the line 12—12 of FIG. 10;

FIG. 13 is a horizontal section taken on the line 13—13 of FIG. 2;

FIG. 14 is a horizontal section taken on the line 14—14 of FIG. 2;

FIG. 15 is a perspective view of the file drawer shown in FIG. 2;

FIG. 16 is a front elevation of the file drawer shown in FIG. 14, but with portions thereof broken away;

FIG. 17 is a fragmentary vertical section taken on the line 17—17 of FIG. 16;

FIG. 18 is a horizontal section taken on the line 18—18 of FIG. 17;

FIG. 19 is a perspective view of the compressor plate shown in FIG. 15;

FIG. 20 is a fragmentary perspective view of the file drawer suspension system, but with portions thereof broken away;

FIG. 21 is an exploded perspective view of the file drawer suspension system shown in FIG. 20;

FIG. 22 is a perspective view of the convenience drawer shown in FIG. 2;

FIG. 23 is a front elevation of the drawer shown in FIG. 22, but with portions thereof broken away;

FIG. 24 is a fragmentary vertical section taken on the line 24—24 of FIG. 23;

FIG. 25 is a horizontal section taken on the line 25—25 of FIG. 24;

FIG. 26 is a fragmentary side elevation of the rear portion of the drawer shown in FIG. 22;

FIG. 27 is an enlarged horizontal section taken on the line 27—27 of FIG. 26;

FIG. 28 is an enlarged perspective view of a cover slidably mountable on the drawer as shown in FIG. 22;

FIG. 29 is a horizontal section taken on the line 29—29 of FIG. 28;

FIG. 30 is a horizontal section taken on the line 30—30 of FIG. 28;

FIG. 31 is a horizontal section taken on the line 31—31 of FIG. 28;

FIG. 32 is an enlarged perspective view of a paper tray insertable into the drawer shown in FIG. 22;

FIG. 33 is a fragmentary plan view of a convenience tray insertable into the drawer shown in FIG. 22;

FIG. 34 is a vertical section taken on line 34—34 of FIG. 33;

FIG. 35 is a fragmentary vertical section taken on the line 35—35 of FIG. 34;

FIG. 36 is an exploded perspective view of the upper drawer suspension system shown in FIG. 2;

FIG. 37 is a perspective view of the center drawer shown in FIG. 1;

FIG. 38 is an enlarged vertical section taken on the line 38—38 of FIG. 37;

FIG. 39 is a horizontal section taken on the line 39—39 of FIG. 38;

FIG. 40 is an enlarged fragmentary side elevation of a rear portion of the drawer shown in FIG. 37;

FIG. 41 is a fragmentary perspective view of the rearwardly disposed cover on the drawer shown in FIG. 37;

FIG. 42 is a horizontal section taken on the line 42—42 of FIG. 40; and

FIG. 43 is an enlarged fragmentary perspective view of the drawer tray shown in FIG. 37.

Figures 1, 2:
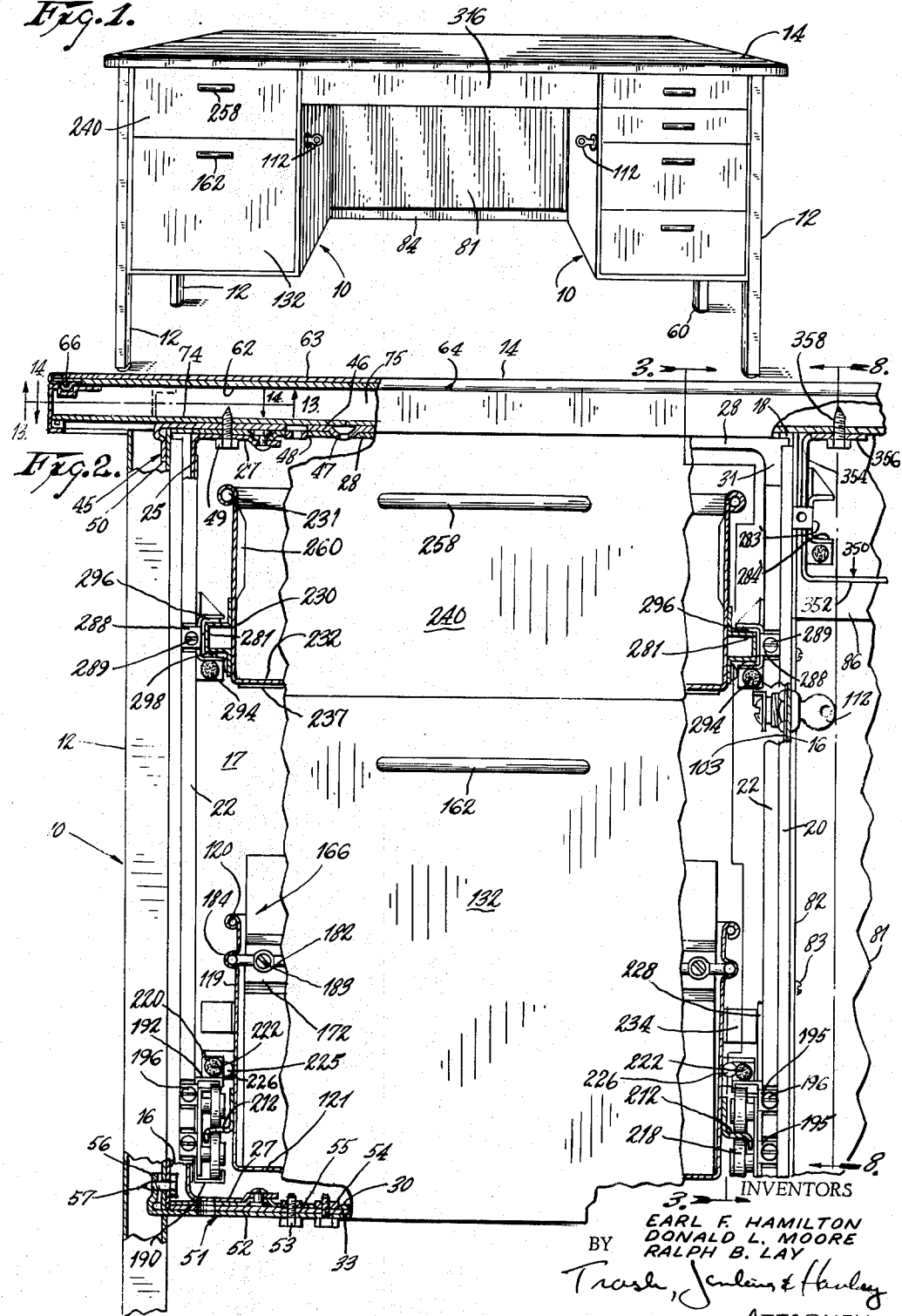
FIG. 1 is a perspective view of a desk embodying our invention.
FIG. 2 is an enlarged fragmentary front elevation of a portion of the desk shown in FIG. 1, but with portions thereof being broken away.

Our invention is illustrated in the drawings as a double pedestal desk comprising a pair of pedestals 10 mounted on ground-engaging legs 12 and having a top 14. The pedestals 10 are identical in construction with the exception of their drawer-supporting guides, the pedestal shown to the left in FIG. 1 being adapted to hold a pair of drawers and the pedestal shown to the right in FIG. 1 being adapted to hold four drawers.

Each of the pedestals 10 comprises a pair of side walls 16 rigidly interconnected at their rear ends by a transversely extending back wall 17 and having inwardly bent flanges 18 and 19 along their upper and lower edges respectively. The flanges 18 and 19 terminate inwardly from the ends of the side walls 16, and at its front edge, each of said side walls is bent inwardly and rearwardly to form a channel 20 with the inner channel leg being further bent inwardly and rearwardly to form a vertically extending offset 22. As shown in FIG. 5, a vertically extending brace 25 is received between each of the offsets 22 and the inner face of the adjacent side wall 16, said brace being rigidly connected to the offset 22 as by welding. Each of the braces 25 has a pair of inwardly extending fingers 27 at its opposed ends, with the fingers at the upper ends of said braces being rigidly connected to a transversely extending brace 28 and the fingers 27 at the lower ends of said braces being connected to a transversely extending brace 30. The legs on the channels 20 terminate inwardly from the upper and lower ends of the side walls 16, and the braces 28 and 30 extend over the upper and lower ends of the braces 25 and have inwardly directed ears 31 rigidly connected to the braces 25 adjacent their upper and lower edges.

As shown, the lower side wall flanges 19 are connected to a pedestal floor 33 along the lateral edges of said floor, and the pedestal back wall 17 is provided with an inwardly extending flange 34 along its lower edge connected to the floor 33 along the rear edge thereof. The forward edge of the floor 33 is bent upwardly and rearwardly to form a channel 35 extending over the forwardly disposed edge of the lower transversely extending brace 30, and said floor is rigidly connected to the lower edges of the side wall channels 20 whereby the channels 20 and 35 form a smooth trim surface around their respective edges of the pedestal.

A forwardly projecting flange 36 extends along the upper edge of the pedestal back wall 17 and is rigidly connected to a transversely extending brace 37 identical in construction to the brace 28 and disposed in parallelism therewith. The brace 37 has a pair of downwardly extending ears 38 at each of its ends which are rigidly connected to a pair of vertically extending braces 39 having fingers 40 at their upper ends also rigidly secured to the brace 37. The lower ends of the braces 39 terminate immediately above the floor 33 and are provided with inwardly extending fingers 41 rigidly connected to a transversely extending brace 42 rigidly connected to the floor 33 and having pairs of upwardly extending ears 43 at each of its ends rigidly connected to the braces 39. Desirably, a silencer 44 formed from any suitable material, such as corrugated board or the like, extends along each side wall 16 between the braces 25 and 39 and may be held therein by the drawer guides hereinafter described.

As shown in FIGS. 1 and 2, a pair of ground-engaging legs 12 are operatively interconnected to each of the pedestals 10 along the remote side walls 16 of the pedestals. The legs 12 are conveniently formed as lengths of metal-tubing, and the forwardly disposed leg 12 on each pedestal 10 is connected to the brace 28 by a bracket 45. As shown in FIGS. 2 and 4, the bracket 45 has an arm 46 disposed over the upper face of the brace 28. The arm 46 has a pair of offsets 47 received in mating openings 48 formed in the brace 28 and is connected to said brace by a screw 49 extending through aligned openings formed in said arm and brace and the finger 27 on the adjacent brace 25. At its outer end the arm 46 is offset forwardly and terminates in a downwardly extending arm 50 received in the open upper end of the leg 12 for holding said leg against the outwardly presented face of the outer pedestal side wall 16. Each of the forwardly disposed legs 12 is connected to the lower end of the pedestal by a bracket 51 having an arm 52 rigidly connected to the pedestal floor 33 and brace 30 by bolts 53 extending upwardly through openings formed in said bracket and floor and received in clinch nuts 54 mounted over openings 55 formed in the brace 30. The outer end of the arm 52 is offset forwardly and is received in an opening formed in the inner wall of the leg 12, with said arm 52 within the extent of the leg 12 being continuous with an upwardly extending arm 56 interconnected to the adjacent pedestal side wall 16 by a screw 57 extending through aligned openings formed in said side wall and the inner wall of said forwardly disposed leg.

Each of the pair of rearwardly disposed legs 12 is interconnected to its adjacent pedestal in the same manner as the pair of forwardly disposed legs 12. As shown in FIG. 6, each of said rearwardly disposed legs is connected at its upper end to the brace 37 by a bracket 45' having an arm 46' carried on the upper face of said brace. The arm 46' has offsets 47' received in mating openings 48' formed in the brace 37 and is connected to said brace by a screw 58 extending through aligned openings formed in said arm and brace and the finger 40 on the adjacent brace 39. The arm 46' is offset rearwardly at its outer end and terminates in a downwardly extending arm 50' received in the open upper end of the adjacent rear leg 12 for retaining the upper end of said leg against the outer face of the pedestal side wall 16. The lower end of said rearwardly disposed leg is connected to the bottom of the pedestal by a bracket 51' having an arm 52' underlying the pedestal floor 33 and connected to said floor and the brace 42 by bolts 53' extending upwardly through openings formed in said bracket and floor and received in clinch nuts 54' mounted over openings 55' formed in the brace 42. The arm 52' is offset rearwardly at its outer end and is received in an opening formed in said readwardly disposed leg, with said arm 52' within the extent of said leg being continuous with an upwardly extending arm 56' rigidly connected to the adjacent pedestal side wall 16 by a screw 57' extending through aligned openings formed in said side wall and the inner wall of said rearwardly disposed leg. As will be apparent, the pairs of brackets 45 and 45' are identical, as are the brackets 51 and 51', so that the brackets in each pair may be used interchangeably.

Conveniently, as shown in FIG. 7, a shouldered plug 59 having a threaded opening extending therethrough is mounted in the lower end of each of the legs 12. Said plug carries a ground-engaging cap 60 connected to a threaded stud 61 received in the plug opening for adjustably positioning said cap relative to the leg 12 to level the desk.

One of the principal advantages in our invention resides in the ability of the pedestals 10 to be used interchangeably on either the left or the right side of the desk, to be used as a single unit in a cabinet structure, or to be used in a credenza structure wherein a plurality of pedestals are disposed in abutting side to side relationship. To this end, as shown in FIG. 4, the transversely extending braces 28, 30, 37, and 42 are provided with the openings 48 and 48', and 55 and 55', adjacent each of their ends so that the legs 12 and the brackets 45 and 45', and 51 and 51', may be mounted on either or both sides of a pedestal. As will be apparent, if it is desired to produce a single pedestal cabinet, it is merely necessary to mount four of the legs 12 on one of the individual pedestals, said legs being connected thereto in the manner previously described. Alternatively, if it is desired to produce a credenza type structure, a plurality of the pedestals 10 are set in abutting side to side relationship and a pair of legs 12 is connected to each of the end pedestals in the manner previously described. The adjacent pedestal units in such a credenza type structure may be interconnected along the bottoms of said units by suitable transversely extending braces rigidly connected to the adjacent ends of adjacent braces 30 and 42 on adjacent pedestals. In such a credenza type structure, the pedestals are further interconnected along their upper ends by a top corresponding to the top 14 which is connected to each of the pedestals 10 in the manner hereinafter described.

As shown in FIGS. 1 and 2, the top 14 extends over both of the pedestals 10 and the space therebetween. Said top comprises a sheet-metal panel 62 preferably having a decorative cover 63 extending thereover and connected thereto by bonding and by a peripherally extending clip 64. As shown in FIG. 3, the clip 64 has an inwardly open channel 65 bindingly received over the panel 62 and cover 63, with lower leg of said channel having an offset 66 formed therein. Secured to the lower face of the panel 62 is a trim molding having an inwardly projecting leg 67 connected to said panel inwardly from the peripheral edge thereof and provided with an offset 68 in which the clip offset 66 is received. The leg 67 is continuous with a skirt 69 projecting downwardly from the clip 64 and terminating at its lower edge in an inwardly bent leg 70 parallel to the leg 67.

As shown, the top 14 is strengthened along its front and rear edges by a pair of braces 71 and along its lateral edges by a pair of braces 72 interposed between the braces 71. The braces 71 and 72 have identical cross-sectional configurations. As shown in FIGS. 13 and 14, the braces 71, which extend the full width of the top, each comprise an upper leg 73 connected to the panel 62 inwardly of the molding leg 67 and integrally interconnected to a lower outwardly projecting leg 74 by a web 75. As shown in FIG. 3, the leg 74 has a stiffening channel 76 at its outer end abutting the molding leg 70 and skirt 69, but portions of the legs 74 are removed from the braces 71 adjacent the ends thereof to accommodate the upper ends of the pedestal legs 12. Each of the braces 72 has an upper leg 73' connected to the panel 62 inwardly from the molding leg 67 and integrally connected to a lower outwardly projecting leg 74' by a web 75'. The outer end of the leg 74' has a stiffening channel 76' abutting the adjacent molding leg 70 and skirt 69. Preferably, the top is further braced by a plurality of transversely extending upwardly open channels having legs 77 connected to the panel 62 and interconnected by webs 78.

As shown, the ends of the braces 72 abut the webs 75 of the braces 71 at the corners of the top. And at each of said corners, the ends of the molding strips overlying the braces 71 and 72 are mitered. The legs 67 on the molding strips extending along the lateral edges of the top top are recessed adjacent their ends to accommodate brace legs 73 intersecting said molding legs.

As shown, the legs 74 on the braces 71 overlie the braces 28 and 37 and are rigidly connected to said braces by the screws 49 and 58 interconnecting the legs 12 to the pedestals. The brace legs 74 are further interconnected to the pedestals 10 adjacent the inner side walls of said pedestals by screws 79 projecting upwardly through openings formed in the braces 28 and 37 and the fingers 27 and 40 on the braces 25 and 39. As shown in FIG. 3, spacers 80 are disposed around the screws 79 between the brace legs 74 and the braces 28 and 37, said spacers having a thickness corresponding to the thickness of the bracket arms 46 and 46'.

As will be apparent, when our invention is embodied in a credenza structure, the top 14, by being connected to the pedestals, will interconnect the adjacent pedestal units in such structure for retaining them in fixed positions with respect to each other. And, when our invention is embodied in a single pedestal cabinet structure, said top need have an extent only slightly larger than the extent of a single pedestal.

When our invention is embodied in a desk as illustrated in the drawing, it is desirable that the two pedestals 10 be interconnected adjacent the rear end of the desk by a modesty panel 81 shown in FIG. 8. The panel 81 spans the space between the pedestals 10 below the top 14 and is provided along its lateral edges with flanges 82 abutting the adjacent pedestal side walls 16 and secured thereto by screws 83. Conveniently, the lower edge of the modesty panel 81 is bent forwardly and upwardly, as at 84, to stiffen said panel and provide a smooth surface along the lower edge thereof. Extending between the pedestals 10 immediately below the top 14 is an upwardly open cord channel 86 the rear leg of which has rearwardly extending flanges 88 at each of its ends which extend over the modesty panel flanges 82 and are rigidly secured thereto as by rivets 90. Conveniently, the flanges 82 are provided with vertically extending offsets within the extent of the flanges 88 whereby the channel flanges 88 may be secured to the modesty panel to form a cord channel-modesty panel sub-assembly. The upper end of the modesty panel 81 is also provided with a forwardly and downwardly extending flange 92 disposed over the rear edge of the cord channel 86, with said cord channel being in open communication with the rear of the desk. An opening 93 is provided in the web of the cord channel 86 adjacent each end thereof through which a telephone cord, light cord, and the like may extend for reception into the channel 86. The cords may extend upwardly from the channel 86 through the space between the top 14 and the modesty panel 81 for connection to their respective accessories supported on the desk top 14 and thus obviate the necessity of long lengths of said cords extending across said top.

As shown in FIG. 1, each of the pedestals 10 is adapted to house a plurality of drawers which may be conveniently locked in closed position by the locking assembly shown in FIGS. 10-12. Desirably, one of said locking assemblies is provided on each of the pedestals 10 adjacent the inwardly presented pedestal side wall 16. The locking assemblies are identical in construction, and each comprises a vertically extending rod 95 having its upper end rotatably carried in an opening formed in a bracket 96 mounted on the pedestal brace 28 adjacent one end thereof. The lower end of the rod 95 rests on the pedestal floor 33 and is rotatably carried in an opening formed in a bracket 98 mounted on the pedestal brace 30. A lock 100 is mounted in the side wall 16 immediately adjacent the rod 95 and is provided with an inwardly extending shank 101 upon which a cam 102 is fixedly mounted. Conveniently, a stiffening plate 103 is interposed between the lock 100 and the side wall 16 for reinforcing said side wall adjacent said lock. Desirably, the plate 103 has a pair of vertically spaced arcuate fingers 104 partially circumscribing the rod 95 and acting in combination with the brackets 96 and 98 for rotatably supporting said rod within the pedestal. A plurality of locking tongues 106 are mounted in axially spaced positions on the rod 95 by screws 107 for rotation with said rod. Each of said tongues 106 has a detent 108 at its outer end engageable with a suitable catch on one of the drawers carried in the pedestal for releasably locking said drawer in a closed position within said pedestal when the rod 95 is rotated into a drawer locking position. To effect rotation of the rod 95, a cam follower 110 is mounted on said rod by a screw 111 to engage the cam 102 so that upon locking movement of a key 112 inserted into the lock 100, the cam 102 will rotate against the cam follower 110 to thus cause said cam follower to rotate the rod 95 in a direction to swing the locking tongues 106 inwardly so that their detents 108 will engage in suitable catches on the pedestal drawers. The rod 95 is rotated into an unlocked position in which the tongues 106 are generally parallel to the adjacent pedestal side wall 16 by a torsion spring 114 having one of its ends fixedly connected to the bracket 98 and its opposite end fixedly connected to said rod. Upon movement of the key 112 to rotate the cam 102 into an unlocked position, the spring 114 will rotate the rod 95 to cause the tongues 106 to swing their detents 108 out of locking engagement with the drawer catches. Thus, the locking assembly illustrated in FIGS. 10-12 simultaneously locks and unlocks the entire bank of drawers which are carried in the pedestal upon which said locking assembly is mounted. Conveniently, the arms 106 are oblique to their adjacent side wall 16 when they are in locked position, so that said arms may be moved into their locked positions while the drawers are open and, upon closing of said drawers, the detents 108 on the arms 106 will engage in suitable drawer catches to lock said drawers in their closed position.

The pedestal 10 shown to the right in FIG. 1 is adapted to house a file drawer which, as shown in FIGS. 15-19, comprises a pair of opposed side walls 119 having outwardly rolled beads 120 along their upper edges and integrally connected at their lower ends by a drawer floor 121 having a laterally centered channel 122 extending the length thereof. A back wall 124 extends across the rear of the drawer and is connected to the side walls 119 by a pair of flanges 125 formed along the lateral edges of said back wall and connected to the inner faces of the side walls 119. The lower edge of the back wall 124 terminates in a pair of laterally spaced, forwardly extending flanges 126 connected to the lower face of the floor 121 on either side of the channel 122, and the upper end of said back wall terminates in a rearwardly rolled bead 128. Conveniently, the back wall 124 may be provided with an opening 130 having a rolled upper edge 131 to facilitate lifting of the drawer when it is removed from the pedestal.

The front of the drawer is formed by a pair of vertically extending panels 132 and 134. As shown in FIG. 17, a flange 136 projects rearwardly and downwardly from the upper edge of the panel 132 to define a chanel 137 extending thereacross, and a flange 138 connected to the drawer floor 121 projects rearwardly and upwardly from the lower edge of said panel and defines a channel 139 extending across the bottom of said panel. The panel 132 projects laterally outwardly beyond the side walls 119, and the lower portion of each lateral edge of the panel is flanged at 140 and connected to the outer face of the adjacent drawer side wall 119. Similarly, the upper portion of each lateral edge of the panel 132 has a flange 142 projecting rearwardly and inwardly from said panel and connected to the inner face of the adjacent side wall 119 adjacent the upper end thereof. The panel 132 has a vertical extent slightly less than the vertical extent of the panel 132 and is provided along its lateral edges with vertically extending flanges 144 abutting the inner faces of the side walls 119 forwardly of the connections of the side walls to the flanges 140. As shown in FIG. 17, the floor 121 extends over the channel 139 and the panel 132 has a forwardly extending flange 146 along its lower edge which is supported on said floor thereat. Conveniently, the floor 121 is provided with a pair of laterally spaced, upwardly struck fingers 148 whose forwardly presented edges abut the panel 134 to interconnect said panel and floor. The panel 134 extends upwardly into the front panel channel 137, and the panels 132 and 134 are interconnected by a pair of bolts 150 extending through aligned openings formed therein and received in the lateral ends of a drawer handle 162 projecting forwardly from the front panel 132.

As shown in FIGS. 15 and 16, a compressor plate 166 extends transversely of the drawer between the side walls 119. The plate 166 has a forwardly extending flange 168 along its lower edge and the upper edge of said plate is provided with a rolled bead 170. Intermediate its upper and lower ends, the plate 166 has a pair of laterally spaced forwardly projecting channels 172 having a common web forming a bridge 174 extending between said channels in which a generally U-shaped latch 176 is carried. As shown in FIG. 19, the latch 176 has a finger lift 178 at its upper end normal to the general plane of the latch, and the lower ends of said latch project through openings formed in the plate flange 168 for selective reception in a pair of rows of longitudinally spaced openings 180 formed in the drawer floor 121 on the opposite sides of the channel 122 for thus releasably locking the compressor plate 166 in the desired longitudinal position along the length of the file drawer. Desirably, a pair of fingers 181 are struck outwardly from the plate 166 in the path of movement of the latch to limit the unlocking movement of said latch. The plate 166 is supported on the drawer on a pair of generally L-shaped rods 182 connected to the channels 172, as by bolts 183, and projecting longitudinally from the compressor plate for slidable reception in longitudinally extending beads 184 formed in the side walls 119 for slidably supporting the compressor plate in the drawer.

The suspension system for the file drawer is illustrated in FIGS. 20 and 21 and comprises a pair of horizontally aligned guides 188 mounted along the opposed sides of the pedestal side walls 16 adjacent the pedestal floor 33. Each of the guides 188 has a generally C-shaped cross-section consisting of a vertical web 189 interconnecting elongated legs forming lower and upper opposed tracks 190 and 192. A pair of offset tongues 193 are struck outwardly of the guide web 189 and are received in openings formed in the adjacent pedestal brace 39. Adjacent its forward end, the guide web 189 has outwardly struck tongues 194 received in the adjacent vertically extending pedestal brace 25. The forward end of the guide 188 terminates at the front face of the adjacent brace 25 and has a pair of outwardly bent fingers 195 connected to said brace 25 by screws 196, the pedestal channel leg 22 being provided with openings disposed in alignment with the fingers 195 for connection of said fingers to the brace 25. In this manner, the pair of guides 188 are fixedly mounted in horizontal alignment along the inner faces of the pedestal side walls 16 in spaced relation thereto and help to hold the silencers 44 in place against said side walls.

Each of the guides 188 carries a propeller channel 198 comprising a vertically extending web 200 interconnecting a first inwardly directed flange leg 201 extending along the upper edge of said web and a second inwardly directed flange leg forming an upwardly open track 202 extending along the lower edge of said web. The propeller 198 is slidably carried in the guide 188 on a pair of longitudinally spaced rollers 203 and 204 mounted on the propeller by axle pins 205 extending through aligned vertically extending slots formed in the propeller web 200 and the inner wall of the track 202 to thus provide each of said rollers with a longitudinally fixed, vertically movable axis. As shown in FIG. 21, the rollers 203 and 204 project through openings formed in the track 202 for reception in the lower guide track 190, and said track is provided with a pair of longitudinally spaced wells 206 for the reception of said rollers when the file drawer is in its fully closed position. The longitudinal movement of the propeller 198 with respect to the guide 188 is limited by an outwardly projecting stud 207 mounted on the propeller web 200 and slidable in a longitudinally extending slot 208 formed in the guide web 189.

As shown in FIG. 21, a longitudinally extending slide 210 is mounted on each file drawer side wall 119 for slidably mounting said file drawer on the propeller 198. The slide 210 comprises an outwardly extending flange 212 normal to the propeller webs 200 and carried on the upper face of the rollers 203 and 204. The flange 212 is continuous with a downwardly extending flange 214 parallel with the webs 200 and interposed between the rollers 203 and 204 and the web 200 for retaining the drawer in a laterally fixed position. As shown in FIG. 21, a pair of longitudinally spaced rollers 216 and 217 are mounted on the propeller web 200 adjacent the upper edge thereof, with the lower end of the roller 216 engaging the upper face of the flange 212 for holding the guide 210 within the propeller 198. The upper ends of both of the rollers 216 and 217 project through openings formed in the upper propeller flange leg 201 and the roller 217 has its upper end in tracking engagement with the upper guide track 192.

Still another roller 218 is mounted on the propeller web 200 forwardly of the track 202 for engagement with the lower surface of the flange 212. The roller 218 is carried in the lower guide track 190 when the drawer is closed and has its lower end disposed above the plane of the lower ends of the rollers 203 and 204 when said rollers are in their lowered position in the wells 206. In this manner, the front of the file drawer will be slightly elevated when said drawer is in its closed position to thus preclude the possibility of said drawer accidentally sliding open. Also mounted on the propeller 198 forwardly of the flange legs 201 and 202 and outside the vertical extent thereof is a bracket 220 carrying a forwardly presented resilient bumper 222 engageable with the flange 140 on the file drawer front panel 132 when said drawer is in its closed position and a rearwardly presented bumper 224 engageable with a laterally projecting stop 225 mounted on the file drawer side wall 119 when said file drawer is moved into its extended position. Conveniently, the bracket 220 also carries an anti-friction button 226 on its inner face against which the outwardly presented face on the adjacent file drawer side wall 119 rides during opening and closing of the drawer.

As shown in FIG. 21, an upwardly projecting plate 228 having an opening 229 formed therein is mounted on the guide 188 adjacent the front thereof, and a bracket 234 having an opening 236 formed therein is also mounted on the file drawer side wall 119. When said file drawer is in its fully closed position, the openings 236 and 229 will come into register with each other and with the detent 108 on the adjacent lock arm 106 of the locking assembly shown in FIG. 10. Thus, upon turning the key 112 into its locked position, the detent 108 will move into the openings 229 and 236 for thus locking the file drawer in its closed position.

The operation of the file drawer suspension system may be described as follows: As the file drawer is pulled outwardly toward its open position, its slide 210 will ride on the propeller rollers 204 and 218 and the rollers 203 and 204 will ride out of the wells 206 and along the track 190. The propeller moves outwardly until its stud 207 abuts the forward end of the guide slot 208, and the drawer rides outwardly relative to the propeller until the drawer stop 225 engages the bumper 224. In this fully extended position, the file drawer slide 210 is supported on the roller 218 and the roller 204 and between the rollers 204 and 216. And the propeller 198 is supported in the guide 188 with the pair of rollers 203 and 204 carried in the lower track 190 and upper roller 217 carried against the upper guide track 192.

To close the file drawer, it is merely necessary to push said drawer inwardly, whereby the slide 210 will ride on the rollers 218 and 204 until the drawer panel 132 engages the bumper 222. Continued inward movement of the file drawer will cause the rollers 203 and 204 to ride rearwardly in the track 190 until the propeller stud 207 engages the rear end of the guide slot 208, whereupon the rollers 203 and 204 will be received in the guide wells 206.

As shown in FIGS. 2 and 22-27, the pedestals 10 are adapted to house a plurality of convenience drawers, each of which comprises a pair of opposed side walls 230 having rolled beads 231 along their upper edges and integrally connected at their lower ends by a drawer floor 232. A back wall 235 extends across the rear of the drawer and is connected to the side walls 230 by a pair of flanges 236 formed on said back wall and connected to the inner faces of said side walls. The lower edge of the back wall 234 terminates in a forwardly projecting flange 237 connected to the lower face of the floor 232, and the upper end of said back wall terminates in a rolled bead 238.

The front of the drawer is formed by a pair of vertically extending panels 240 and 242. As shown in FIG. 24, a flange 244 projects rearwardly and downwardly from the upper edge of the panel 240 to define a channel 245 extending thereacross, and a flange 246 projects rearwardly from the lower edge of said panel and is connected to the lower face of the floor 232. The panel 240 projects laterally outwardly beyond the side walls 230, and each lateral edge of said panel has a rearwardly and inwardly projecting flange 248 connected to the outer face of the adjacent side wall 230. The panel 242 has a vertical extent slightly less than the vertical extent of the panel 240 and is provided along its lateral edges with vertically extending flanges 250 abutting the inner faces of the side walls 230 forwardly of the connection of said side walls to the flange 248. As shown in FIG. 24, the floor 232 extends forwardly of the rear edge of the flange 246, and the panel 242 has a forwardly extending flange 252 along its lower edge which is supported on said floor. Conveniently, the floor 232 is provided with a pair of laterally spaced, upwardly struck fingers 254 whose forwardly presented edges abut the panel 242 to rigidly interconnect said panel and floor. The panel 242 extends upwardly into the front panel channel 245, and said panel 242 is supported against the flange 244 within the extent of said channel. The panels 240 and 242 are interconnected by a pair of bolts 256 extending through aligned openings formed in said panels and received in the lateral ends of a drawer handle 258 projecting forwardly from the front panel 240.

Intermediate their ends the side walls 230 have inwardly projecting longitudinally extending channels 260 in which a plurality of transversely aligned, vertically extending slots 262 are formed. The slots 262 selectively receive the lateral ends of a divider 264 extending transversely of the drawer with its lower end resting on the floor 232 and its upper end provided with a stiffening bead 265. As will be apparent, a plurality of dividers 264 may be selectively carried in the slots 262 for dividing the drawer into a plurality of various sized compartments.

It may also be desired to provide a work surface on the drawer illustrated in FIG. 22. To this end, a cover plate 267 shown in FIGS. 28-31 may be disposed over said drawer. The plate 267 has a width corresponding to the width of the drawer and may have any desired length. In order to adjust the positioning of the cover on the drawer, said cover is provided along its lateral edges with inwardly bent flanges 268 having anti-friction buttons 269 mounted thereon adapted to ride along the side wall beads 231. The buttons 269 are retained on the beads 231 by channels 270 formed along the lateral edges of the plate 267 on opposite sides of the flanges 268 and received over the beads 231, the channels 270 having offsets 271 slidably received against said beads 231. Conveniently, the plate 267 is also stiffened by inturned flanges 272 formed along its front and rear edges.

The drawer shown in FIG. 22 may also be used in combination with the paper tray illustrated in FIG. 32. As shown, said tray has a width corresponding to the drawer and comprises a plurality of stepped inclined faces 274. The faces 274 are interconnected in parallelism with each other by downwardly extending projections 275 formed along the lateral edges of each of said faces and having fingers 279 received in openings formed in the next lower face. Said faces are further provided with transversely extending flanges 276 extending along the rear edges of said faces with the flange 276 on each of said faces engaging the next upper face. Conveniently, the forward edge of each face 274 is recessed, as at 277, and is provided with a pair of rolled beads 278 extending laterally outwardly from said recess. To mount the tray in the drawer shown in FIG. 20, the beads 278 on the lowermost face 274 are disposed over the divider bead 265, and the fingers 279 on its projections 275 are inserted in openings 280 formed in the divider 264.

The suspension system for drawers of the type illustrated in FIG. 22 is shown in FIGS. 2 and 36 and comprises a pair of longitudinally extending channeled slides 281 mounted on the drawer side walls 230 and extending rearwardly thereof. The slides are slidably carried in a pair of opposed guides 282 extending along the pedestal side walls 16 in spaced relation thereto. The guides 282 are identical in construction, and each has a generally C-shaped cross-sectional configuration comprising an elongated web 283 interconnecting a pair of parallel inwardly extending legs 284. The guide web 283 has a pair of outwardly struck fingers 286 adjacent its rear end which are carried in openings formed in the adjacent pedestal brace 39. As shown in FIG. 36, the guide web 283 has an expanded vertical extent forwardly of the guide legs 284 and is provided at its forward end with an outturned finger 288 connected to the adjacent pedestal brace 25 by a screw 289. Conveniently, the expanded portion of the web 283 is further provided with an outwardly struck tongue 290 received in an opening formed in the pedestal brace 25 for further interconnecting said guide and brace. Mounted on the inner face of the expanded portion of the guide web 283 is a bracket 292 having a forwardly presented bumper 294 disposed below the plane of the lower guide leg 284 and engageable with the panel flange 248 when the drawer is moved into its closed position. A rearwardly presented bumper 295 is also mounted on the bracket 292 below the plane of the lower guide leg 284 and, when the drawer is moved into its fully open position, engages a laterally projecting stop 297 mounted on the drawer floor 232 adjacent the rear thereof. Conveniently, an anti-friction button 298 is mounted on the upper face of the bracket 292 to project slightly above the lower guide leg 284 to engage the drawer slide 281 and a second anti-friction button 293 projects from said bracket to also engage said slide for facilitating the sliding movement thereof. To further facilitate movement of the slides 281 in the guides 282, a generally L-shaped anti-friction member 296 and an anti-friction button 297 are mounted on each slide 281 adjacent the rear thereof, the member 296 engaging the adjacent guide web 283 and upper leg 284 and the button 297 engaging the adjacent lower guide leg 284.

As shown in FIG. 36, the drawer slide 281 is provided with an opening 300 adjacent its forward end and the guide web 283 is provided with a similar opening 302 adjacent the forward ends of the guide legs 284 and disposed in alignment with the detent 108 on the adjacent locking arm 106. When the drawer is in its fully closed position, the drawer slide opening 300 will register with the opening 302 to permit the detent 108 on the adjacent locking arm 106 to extend through both of the openings 302 and 300 for locking said drawer in its closed position.

A center drawer is carried between the pedestals 10 forwardly of the modesty panel 81 and, as shown in FIGS. 37–43, said center drawer comprises a pair of opposed side walls 305 interconnected at their lower ends by a floor 307 and provided with rolled beads 306 along their upper edges. A back wall 308 extends across the rear of the drawer and is connected to the side walls 305 by a pair of flanges 310 formed along the lateral edges of said back wall and connected to the inner faces of the side walls 305. The lower edge of the back wall 308 terminates in a forward extending flange 312 connected to the lower face of the floor 307, and the upper end of said back wall terminates in a rolled bead 314.

The front of the drawer is formed by a vertically extending panel 316 having a depth greater than the depth of the side walls 305 and a width greater than the lateral spacing between said side walls. As shown in FIG. 38, the upper end of the panel 316 comprises a rearwardly and downwardly projecting flange 318 extending below the plane of the side wall beads 306, and the lower edge of the panel 316 comprises a rearwardly and upwardly projecting flange 320 connected to the lower face of the floor 307. The panel 316 projects laterally outwardly beyond the side walls 305, and the lateral edges of said panel comprise rearwardly and inwardly projecting flanges 322 connected to the outer faces of the drawer side walls 305.

Desirably, the center drawer is provided with a convenience tray for holding pencils, paper clips, rubber bands, etc. As shown in FIG. 43, said tray is formed as a sheet-metal stamping and comprises a pair of transversely extending vertical legs 325 and 326 interconnected by a downwardly dished web 328 which is provided with a plurality of elongated corrugations 329 for holding pencils. The ends of the tray abut the opposed inner faces of the drawer side walls 305 and its forwardly presented leg 325 is disposed within the extent of the front panel flange 318. As shown in FIG. 38, the leg 325 has a height slightly greater than the distance between the drawer floor 307 and the lower edge of the flange 318 for thus retaining the tray in position within the drawer. Said tray is further retained in position in the drawer by screws 330 extending through the drawer floor 307 and received in openings formed in a forwardly directed flange 332 formed on the lower end of the rear tray leg 326. Conveniently, a plurality of laterally spaced dividers 334 are mounted on the tray outside the extent of the web corrugations 329. As shown in FIG. 43, each of the dividers 334 has a generally rectangular configuration and projects through aligned slots formed in the web 328 for engagement with inwardly struck fingers 336 formed on the tray legs 325 and 326 for thus suupporting said dividers in the tray.

Conveniently, the center drawer has a transversely extending cover 338 at its rear end to prevent papers from slipping out over the back wall 308. As shown in FIG. 41, the cover 338 has a downwardly projecting lip 340 and upwardly projecting lip 342 extending transversely across its front and rear edges, respectively, and is mounted on the drawer by a pair of channels 344 formed along the lateral cover edges and received over the side wall beads 306.

To mount the center drawer on the desk, a plurality of transversely extending U-shaped carriers 350 are mounted on the lower face of the top 14 between the pedestals 10. Each of the carriers 350 includes a bight 352 parallel with the top and having upwardly extending arms 354 at its opposed ends which abut the opposed inner side walls 16 on the pair of pedestals 10. Each of the arms 354 extends upwardly from the bight 352 and terminates at its upper end in an inwardly directed finger 356 connected to the web 78 of one of the top cross braces by screws 358. The suspension system for the center drawer is supported from the carrier arms 354 and is identical in construction to the suspension system shown in FIG. 28 for the convenience drawers.

As shown in FIGS. 2 and 4, the suspension system at each side of the center drawer comprises an elongated slide 281' mounted on the outer face of each drawer side wall 305. Each of the slides 281' is carried in a guide 282' mounted on one of the carrier arms 354 and comprising a vertically extending web 283' interconnecting a pair of upper and lower legs 284'. The web 283' extends forwardly beyond the legs 284' and has a bracket 292' mounted thereon. A bumper 294' is mounted on the forwardly presented face of the bracket 292' and is engageable with the panel flange 322 when the center drawer is moved into its fully closed position. A second bumper 295' is mounted on the bracket 292' below the lower guide leg 284' and is engageable with a laterally projecting stop 360 mounted on the drawer floor 307 adjacent the rear thereof. Conveniently, a pair of anti-friction buttons 298' and 293' are mounted on the bracket 292' to engage the adjacent slide 281' for facilitating sliding movement of the drawer slide 281' in the guide 282'. To further facilitate sliding movement of the center drawer, an L-shaped anti-friction member 296' and an anti-friction button 297' are mounted on each slide 281' for sliding engagement with the adjacent guide web 283' and guide legs 284'.

In some embodiments of our invention the center drawer may be omitted, in which case it is desirable to mount a convenience tray for holding pencils, paper clips, rubber bands, etc. in one of the drawers of the type shown in FIG. 22. As shown in FIGS. 33–35, such a tray comprises a pair of transversely extending vertical legs 361 interconnected by a downwardly dished web 362 which is provided with a plurality of elongated corrugations 364 for holding pencils. A pair of end plates 366 are disposed at the ends of the tray and are connected to the tray legs 361 by flanges 368. The end plates 366 have outwardly projecting flanges 369 along their upper edges which are received over the side wall beads 231 for supporting the tray in said drawer. Conveniently, a plurality of laterally spaced dividers 370 are mounted on the tray outside the extent of the web corrugations 364. As shown in FIG. 34, each of the dividers 370 has a generally rectangular configuration and projects through aligned slots formed in the web 362 for engagement with inwardly struck fingers 372 formed in the tray legs 361 for thus supporting said dividers in the tray.

While our invention has been described as being embodied in a desk, it is to be understood, of course, that the pedestal construction and various drawer constructions may be embodied in cabinets and credenzas, and that said drawers may be employed in any desired combination depending upon the use to which the resulting structure is to be put.

We claim:
1. In an article of furniture,
   (a) a pedestal comprising a pair of side walls interconnected by a floor and back wall,
   (b) pluralities of transversely extending upper and lower braces operatively interconnected to the upper ends of said side walls and floor, respectively, and said back wall having inwardly projecting means connected to the rearmost of said upper braces,
   (c) a plurality of vertically extending braces connected to said upper and lower braces and each abutting the inner face of one of said side walls,
   (d) a top rigidly connected to said upper braces and closing the top of said pedestal,
   (e) at least one pair of aligned drawer guides mounted on said vertically extending braces, and
   (f) a drawer slidably supported in said guides.
2. The invention as set forth in claim 1 in which
   (a) said drawer guides are mounted on said vertically extending braces in spaced relation to said side walls, and
   (b) silencers are interposed between said guides and the pedestal side walls.
3. The invention as set forth in claim 1 in which said top comprises
   (a) a horizontally disposed panel, and
   (b) a plurality of brace means rigidly connected to the underside of said panel,
   (c) at least one pair of said brace means being disposed in alignment with a pair of said upper braces and rigidly connected thereto.
4. In an article of furniture,
   (a) a pedestal comprising a pair of side walls interconnected by a floor and a back wall,
   (b) plurality of transversely extending upper and lower braces operatively interconnected to the upper ends of said side walls and floor, respectively,
   (c) a plurality of vertically extending braces connected to said upper and lower braces along the opposed inner faces of said side walls,
   (d) a top formed from a horizontally disposed panel,
   (e) a peripheral molding mounted on said panel and having downwardly extending skirt terminating in an inturned leg,
   (f) a plurality of braces having first upper legs mounted on said panel and connected by webs to second lower legs the ends of which are carried on said inturned leg on said molding skirt,
   (g) at least one pair of said second lower legs being disposed in alignment with said upper braces and rigidly connected thereto,
   (h) at least one pair of aligned drawer guides mounted on said vertically extending braces, and
   (i) a drawer slidably supported in said guides.
5. The invention as set forth in claim 4 with the addition that
   (a) a covering extends over said panel, and
   (b) a generally U-shaped clip extends over the peripheral edges of said covering and panel,
   (c) said clip and molding having cooperative means for retaining them in fixed relation to each other.
6. The invention as set forth in claim 1 with the addition that
   (a) each of said side walls is integral with the back wall at its rear edge and has a rearwardly projecting channel along its forward edge received over one of said vertical extending braces, and
   (b) said floor has a rearwardly extending channel along its forward edge received over one of said lower braces.
7. The invention as set forth in claim 1 with the addition that
   (a) each of said upper and lower braces has ears at its opposed ends rigidly connected to a pair of said vertically extending braces, and
   (b) each of said vertically extending braces has a pair of fingers at its opposed ends rigidly connected to a pair of said upper and lower braces.
8. In an article of furniture,
   (a) a pedestal comprising a pair of side walls interconnected by a floor and back wall,
   (b) pluralities of transversely extending upper and lower braces operatively interconnected to the upper ends of said side walls and floor, respectively, and said back wall having inwardly projecting means connected to the rearmost of said upper braces,
   (c) a plurality of vertically extending braces connected to said upper and lower braces and each abutting the face of one of said side walls,
   (d) a top rigidly connected to said upper braces and closing the top of said pedestal,
   (e) a plurality of ground-engaging legs formed from lengths of metal-tubing and each being rigidly interconnected at its upper end to one of said upper braces and rigidly interconnected adjacent its lower end to one of said lower braces,
   (f) at least one pair of aligned drawer guides mounted on said vertically extending braces, and
   (g) a drawer slidably supported in said guides.
9. In an article of furniture,
   (a) a pedestal comprising a pair of side walls interconnected by a floor and back wall,
   (b) pluralities of transversely extending upper and lower braces operatively interconnected to the upper ends of said side walls and floor, respectively,
   (c) a plurality of vertically extending braces connected to said upper and lower braces along the opposed inner faces of said side walls,
   (d) a top rigidly connected to said upper braces and enclosing the top of said pedestal,
   (e) a plurality of ground-engaging legs formed from lengths of metal-tubing and each rigidly interconnected to a pair of said upper and lower braces by a pair of L-shaped brackets,
   (f) one of said brackets having a first arm connected to the upper of said pair of braces and a second arm received in the top of said leg,

(g) the other of said pair of brackets having a first arm connected to the lower of said pair of braces and projecting through an opening formed in said leg to dispose its second arm with said leg, (h) fastening means extending through said leg, the adjacent pedestal side wall, and said second arm on said other of said pair of brackets, (i) at least one pair of aligned drawer guides mounted on said vertically extending braces, and (j) a drawer slidably supported in said guides.

10. The invention as set forth in claim 9 in which (a) said top and said brackets connected to said upper braces are connected to said upper braces by common fastening means.

11. In an article of furniture, (a) a pair of laterally spaced pedestals, each of which comprises a pair of side walls interconnected by a floor and a back wall, (b) pluralities of transversely extending upper and lower braces in each of said pedestals operatively interconnected to the upper ends of said side walls and floors, respectively, and said back wall having inwardly projecting means connected to the rearmost of said upper braces, (c) a plurality of vertically extending braces connected to said upper and lower braces and each abutting the inner face of one of said side walls, (d) a top extending over and between said pedestals and rigidly connected to the upper braces therein for interconnecting said pedestals, (e) a pair of ground-engaging legs formed from lengths of metal-tubing and mounted on each of said pedestals, each of said legs being rigidly interconnected at its upper end to one of said upper braces and adjacent its lower end to one of said lower braces, (f) pairs of aligned drawer guides mounted in said pedestals, and (g) a plurality of drawers slidably supported in said guides.

12. In an article of furniture, (a) a pair of laterally spaced pedestals, each of which comprises a pair of side walls interconnected by a floor and a back wall, (b) pluralities of transversely extending upper and lower braces in each of said pedestals, operatively interconnected to the upper ends of said side walls and floor, respectively, (c) a plurality of vertically extending braces connected to said upper and lower braces along the opposed inner faces of said side walls, (d) a top extending over and between said pedestals and rigidly connected to the upper braces therein for interconnecting said pedestals, (e) a pair of ground-engaging legs formed from lengths of metal-tubing and mounted on each of said pedestals, each of said legs being connected to a bracket extending over the upper face of one of said upper braces, (f) said top has brace means mounted thereon with at least two of said brace means overlying said upper braces and each of said brackets, (g) first fastening means interconnecting said brackets, upper braces and brace means, (h) second fastening means interconnecting said brace means and upper braces outside the extent of said brackets, (i) pairs of aligned drawer guides mounted in said pedestals, and (j) a plurality of drawers slidably supported in said guides.

13. The invention as set forth in claim 12 with the addition that (a) spacers are interposed between said upper braces and brace means adjacent said second fastening means.

14. In an article of furniture, (a) a pair of laterally spaced pedestals, each of which comprises a pair of side walls interconnected by a floor and a back wall, (b) pluralities of transversely extending upper and lower braces in each of said pedestals operatively interconnected to the upper ends of said side walls and floors, respectively, (c) a plurality of vertically extending braces connected to said upper and lower braces along the opposed inner faces of said side walls, (d) a top extending over and between said pedestals and rigidly connected to the upper braces therein, (e) a panel mounted on the adjacent side walls of said pair of pedestals in spaced relation to said top, (f) a transversely extending, U-shaped, upwardly open, cord supporting channel mounted on said panel adjacent the upper end thereof and having at least one opening formed in the web thereof, (g) a pair of ground-engaging legs mounted on each of said pedestals, (h) pairs of aligned drawer guides mounted in said pedestals, and (i) a plurality of drawers slidably supported in said guides.

15. The invention as set forth in claim 14 in which (a) said channel extends transversely across the forwardly presented face of said panel and the upper end of its forwardly disposed leg terminates adjacent the bottom of said top.

16. The invention as set forth in claim 14 in which (a) said panel has flanges along its marginal edges normal to the plane of said panel with the flanges along its lateral edges being connected to said pedestal side walls by fastening means and the flange along its upper end extending over the rearwardly presented leg of said channel, and (b) said channel has rearwardly extending flanges along its lateral edges rigidly connected to the flanges along the lateral edges of said panel.

17. In an article of furniture, (a) a pair of laterally spaced pedestals, each of which comprises a pair of side walls interconnected by a floor and back wall, (b) pluralities of transversely extending upper and lower braces in each of said pedestals operatively interconnected to the upper ends of the side walls and floor, respectively, (c) a plurality of vertically extending braces in each of said pedestals connected to said upper and lower braces along the opposed inner faces of said side walls, (d) a top extending over and between said pedestals and comprising a horizontally disposed panel having a plurality of brace means rigidly connected to the underside thereof, at least one pair of said brace means being disposed in alignment with a pair of said upper braces on said pedestals and rigidly connected thereto, (e) a plurality of generally U-shaped carriers having bights extending transversely between said pedestals and upwardly projecting legs connected to said top for mounting said carriers thereon with their bights disposed therebelow.

(f) a pair of opposed drawer guides mounted on said carrier legs, and (g) a drawer carried in said guide for sliding movement therealong.

18. In an article of furniture, (a) a pedestal comprising a pair of side walls interconnected by a floor and back wall, (b) a plurality of braces mounted within said pedestal and cross-bracing the same, (c) a top mounted on said pedestal and closing the upper end thereof,

17

(d) a plurality of pairs of opposed members operatively supported on said braces and each comprising a vertically extending web interconnecting a pair of elongated, inwardly projecting legs,
(e) a drawer having longitudinally extending lateral projections slidably carried in each pair of said members between the pair of legs thereon,
(f) stop means on said web forwardly and outside the the vertical extent of said pair of legs and engageable with means on said drawer for limiting the fore and and aft sliding movements thereof, and
(g) anti-friction means projecting inwardly from said members for engagement with said drawer.

19. The invention as set forth in claim 18 with the addition that
(a) anti-friction means are mounted on said projections and engage the webs and opposed faces of the legs on each of said members.

20. In combination with an article of furniture having a pedestal provided with a pair of side walls interconnected by a top, floor, and back wall, a drawer suspension comprising
(a) a pair of opposed members operatively supported along said side walls and each having a web interconnecting a pair of vertically spaced, inwardly projecting elongated legs,
(b) a bracket mounted on said web adjacent forward end thereof, outside the vertical extent of said legs,
(c) a first bumper mounted on said bracket and projecting rearwardly therefrom,
(d) a second bumper mounted on said bracket and projecting rearwardly therefrom,
(e) a drawer movable with respect to said members having elongated lateral projections and provided with fixed anti-friction means adjacent the rear end of the drawer slidably received against said webs and legs and means out of engagement with said legs and engageable with said first and second bumpers for limiting fore and aft sliding movement of said drawer relative to said members,
(f) a pair of anti-friction members mounted on said bracket with one of said members projecting upwardly therefrom and the other said members projecting inwardly therefrom to provide vertical and horizontal anti-friction surfaces slidably engageable with the projections on said drawer.

21. In combination with an article of furniture having a pedestal provided with a pair of side walls interconnected by a top, floor, and back wall, a drawer suspension comprising
(a) a pair of opposed guides fixedly mounted along said side walls and each having a web interconnecting a pair of opposed tracks,
(b) a pair of opposed members supported within said guides and each having a web interconnecting a pair of vertically spaced, inwardly projecting legs,
(c) pluralities of rollers mounted on said members with their remote ends projecting through said legs for movably supporting said members in said tracks and their adjacent ends disposed within the vertical extent of said legs,
(d) a drawer having lateral projections carried between and against the adjacent ends of said rollers for movably supporting said drawer on said members,
(e) each of said drawer projections having a first surface generally normal to the webs on said members and interposed between the adjacent ends of the rollers on an adjacent member and continuous with a second surface parallel to said webs and interposed between the rollers and web on said adjacent member,
(f) at least one of said guide webs having a longitudinally extending slot formed therein for reception of a laterally projecting stud on the adjacent member whereby said slot and stud will limit movement of said members relative to said guide, and

18

(g) means adjacent one end of at least one of said members engageable with means on said drawer for limiting movement of said drawer relative to said members.

22. The invention as set forth in claim 21 in which
(a) said means adjacent one end of at least one of said members comprises a bracket mounted on the web of said one member having forwardly and rearwardly presented bumpers mounted thereon outside the vertical extent of said legs, and
(b) said means on said drawer comprises the front of said drawer engageable with said forwardly projecting bumper for limiting rearward movement of the drawer with respect to said member and a second laterally projecting stop adjacent the rear of said drawer for limiting forward movement of the drawer with respect to said member.

23. The invention as set forth in claim 21 in which
(a) each of said members has a first set of longitudinally spaced rollers mounted on its web adjacent the upper end thereof,
(b) a second set of longitudinally spaced rollers mounted on said web adjacent the lower end thereof,
(c) at least one of the rollers in said second set of rollers having a vertically movable axis and being receivable in a well formed in said lower guide track when said member is in position to dispose said stud at the rear end of said slot,
(d) the most forward roller in said second set of rollers having a fixed axis positioned to dispose its lower edge above the lower edge of the roller received in said well when the latter is in said well.

24. The invention as set forth in claim 23 with the addition that
(a) the roller receivable in said well has a vertically movable axis, and
(b) the most forward roller in said second set of rollers has a fixed axis positioned to dispose its lower edge above the lower edge of the roller received in said well when the latter is in said well.

25. In combination with an article of furniture having a pedestal provided with a pair of side walls having drawer supports extending therealong and interconnected by a top, floor, and back wall, a drawer carried in said supports comprising
(a) a pair of side walls interconnected by a floor and back wall,
(b) a front panel extending across the front edges of said drawer side walls and projecting laterally and vertically beyond the extent of said side walls,
(c) said front panel having its lateral and bottom edges bent rearwardly and connected respectively to said drawer side walls and floor rearwardly of the forward edges thereof, the upper edge of said panel terminating a transverse downwardly open channel,
(d) a transversely extending tray having a pair of vertically extending legs supported on the drawer floor and interconnected at their upper ends by a downwardly projecting web,
(e) said web having an arcuate first portion and a second portion provided with elongated transverse corrugations, and
(f) a plurality of transversely spaced plates having their ends received in slots formed in said first web portion and supported on offsets formed in said pair of legs.

26. The invention as set forth in claim 25 in which
(a) the upper end of one of said legs is received in said downwardly open front panel channel, and
(b) the lower end of the other of said legs is connected to the drawer floor.

(References on following page)

References Cited by the Examiner

UNITED STATES PATENTS

| | | | |
|---|---|---|---|
| 1,080,513 | 12/1913 | Jones | 312—214 |
| 1,290,743 | 1/1919 | Herpst et al. | 312—214 |
| 1,352,002 | 9/1920 | Jones | 312—214 |
| 1,705,151 | 3/1929 | Card | 312—194 |
| 1,769,255 | 7/1930 | Card | 312—195 |
| 1,826,670 | 10/1931 | Ohnstrand | 312—195 X |
| 1,866,174 | 7/1932 | Richardson | 312—195 |
| 2,011,189 | 8/1935 | Anderson | 312—348 X |
| 2,191,290 | 2/1940 | Richardson | 312—194 |
| 2,265,927 | 12/1941 | Pratt | 312—338 |
| 2,293,210 | 8/1942 | Marzolf | 312—348 X |
| 2,387,506 | 10/1945 | Freeman | 312—195 |
| 2,559,579 | 7/1951 | Abrahamson | 312—219 |
| 2,679,447 | 5/1954 | Bissman | 312—338 |
| 2,733,972 | 2/1956 | Diack | 312—341 |
| 2,795,471 | 6/1957 | Reineman | 312—194 |
| 2,859,070 | 11/1958 | Gomersall | 312—339 X |
| 3,023,066 | 2/1962 | Mohr | 312—219 |

FOREIGN PATENTS 228,216  5/1958  Australia.

FRANK B. SHERRY, *Primary Examiner.*

CHANCELLOR E. HARRIS, *Examiner.*